United States Patent [19]
Pogers

[11] 3,868,997
[45] Mar. 4, 1975

[54] PROCESS FOR PREPARING AND USING AQUEOUS POLYACRYLAMIDE SOLUTIONS FOR THE SECONDARY RECOVERY OF OIL

[75] Inventor: Richard J. Pogers, Denver, Colo.

[73] Assignee: Marathon Oil Company, Findlay, Ohio

[22] Filed: Jan. 3, 1973

[21] Appl. No.: 320,789

[52] U.S. Cl............... 166/275, 137/13, 166/274
[51] Int. Cl............................................. E21b 43/22
[58] Field of Search........... 166/270, 274, 275, 273, 166/305 R; 252/8.55 D; 137/13

[56] References Cited
UNITED STATES PATENTS

| | | | |
|---|---|---|---|
| 2,827,964 | 3/1958 | Sandiford et al. | 166/274 |
| 3,020,953 | 2/1962 | Zerweck et al. | 166/274 |
| 3,039,529 | 6/1962 | McKennon | 166/275 |
| 3,370,649 | 2/1968 | Wogelmuth | 166/274 |
| 3,658,129 | 4/1972 | Lanning et al. | 166/270 |

*Primary Examiner*—Stephen J. Novosad
*Attorney, Agent, or Firm*—Joseph C. Herring; Richard C. Wilson, Jr.; Jack L. Hummel

[57] ABSTRACT

Polymer gel, e.g., polyacrylamide gel, is chilled until frozen and is ground up in a mill. The frozen particles of the polymer gel are then dissolved in water to form an aqueous solution having good efficiency in the recovery of petroleum from formations.

7 Claims, No Drawings

PROCESS FOR PREPARING AND USING AQUEOUS POLYACRYLAMIDE SOLUTIONS FOR THE SECONDARY RECOVERY OF OIL

BACKGROUND OF THE INVENTION

1. Field of the Invention:

The present invention relates to the field of secondary type recovery of petroleum from formations and to the preparation of drive fluids for such purposes, generally classified in U.S. Pat. Office Class 166.

2. Description of the Prior Art:

The dissolving of polymer gels, e.g. polyacrylamide gels, to prepare aqueous solutions thereof, has previously been accomplished by slowly stirring in dilution water, by high agitation mixing, by roll mixing and by various other techniques. These methods have involved substantial time and have required the storage of relatively large amounts of solution.

SUMMARY OF THE INVENTION

General Statement of the Invention:

According to the present invention, a polymer gel, e.g. polyacrylamide gel, is chilled from about −30 to about 320°F, thereby freezing the gel. The frozen gel is ground up in a suitable mill and the resulting particles are added to water and stirred until dissolved, forming an aqueuous solution which is then utilized for the secondary-type recovery of petroleum from formations, or for other purposes.

Polyacrylamide gel for use in the present invention may be prepared by dissolving acrylamide monomer in deoxygenated water, adjusting the pH to from about 4.2 to about 7.0 by the addition of buffering compounds, a polymerization catalyst, and maintaining the resulting mixture in a quiescent state until polyacrylamide gel is formed.

The invention is superior to existing methods for the production of aqueous solutions of polymer gels because it reduces the solution time, thereby requiring less time and storage e space.

Utility of the Invention:

The present invention is useful for a wide variety of purposes including the secondary-type recovery of petroleum from formations. By "secondary-type recovery of petroleum" is meant a process in which petroleum is displaced within a petroleum-bearing formation through the action of drive fluids. Such recovery may be primary, where the drive fluids are used to supplement the natural gas or water drive of the formation; secondary, where the natural gas or water drive of the formation has been substantially depleted; or tertiary, where the drive fluids are injected after the injection of water flooding media or other conventional displacement fluids. Other uses for the aqueous solutions prepared according to the present invention can include boundary layer fluids for injection along interiors of pipelines to promote the pipelining of high viscosity crude oil and other high viscosity fluids, monometer fluids, etc.

DESCRIPTION OF THE PREFERRED EMBODIMENTS

Starting materials:

The starting materials for the present invention are polymers, suitable refrigerant, and dilution water.

Polyacrylamide polymers:

The polyacrylamides for use with the present invention may be commercially available unhydrolyzed or partially hydrolyzed polyacrylamides having molecular weights in the range of from above $0.1 \times 10^6$, preferably from 0.5 to $40 \times 10^6$, more preferably from $1 \times 10^6$ to $15 \times 10^6$, and most preferably from $3 \times 10^6$ to $10 \times 10^6$. Preferably the polyacrylamide will be present in amounts of from 0.001 to about 10, more preferably from 0.01 to about 1, and most preferably from 0.02 to about 0.2 weight percent based on the weight of the total aqueous solution.

Other polymers:

Other polymers may also be used with the present invention. Such polymers may be, but are not limited to, hydroxyethyl cellulose, vinyl acetate-crotonic acid copolymer, and poly vinyl acetate/polyvinylpyrrolindone.

Refrigerant:

Any refrigerant which will freeze the polyacrylamide gel is suitable for use in this invention. If a process is used where the gel comes into direct contact with the refrigerant, the refrigerant must be chosen so as to be inert and unreactive with the gel.

Water:

The water used as a solvent for the aqueous solutions of the present invention can be connate water, for example, Palestine lime water, fresh water, or brackish water. It is preferable that the water contain less than about 300,000, more preferably less than about 10,000, and most preferably less than about 500 parts per million of dissolved solids. The resulting aqueous solution of polyacrylamide will preferably have a viscosity in the range of from about 2 to about 2000, more preferably from about 5 to about 500, and most preferably from about 10 to about 100 centipoises.

Temperature:

The polymer gel may be chilled, e.g., by direct contact with the freezing media which is maintained at a temperature of from about −30°F to about −320°F, for a period of from about 1 to about 100, more preferably from 2 to about 60, and most preferably from about 5 to about 30 minutes.

Grinding:

The frozen polyacrylamide gel may be ground by any suitable mechanical grinder, e.g., a rotary dry-ice pulverizer. Adequate grinding should result in particles of polyacrylamide that are from about 10 to about 100,000, more preferably from about 100 to about 10,000, and most preferably from about 250 to about 1000 microns in size.

Screen factor:

Testing for "screen factor" is done according to the Society of Petroleum Engineers Paper No. 2867.

Examples:

The invention will be more fully understood from the following examples which are taken as being merely illustrative of the invention.

EXAMPLE 1

Polyacrylamide gel is frozen by direct contact with a dry ice acetone bath at a temperature of −75°F for approximately 15 minutes. The frozen gel is then ground in a dry ice pulverizer and the resulting particles are dissolved in an aqueous solution of 3 percent sodium chloride brine to form a solution concentration of 2500 ppm in the polyacrylamide polymer. The polyacrylamide polymer gel requires only approximately 12 hours to dissolve. This polyacrylamide polymer solution has an intrinsic viscosity of 13.75 deciliters per gram (dl/g), a screen factor of 51.8, and a Brookfield LV-1 viscosity of 22.5 cp.

EXAMPLE 2

Polyacrylamide gel is frozen by direct contact with liquid nitrogen at a temperature of −320°F for approximately 15 minutes. The frozen gel is ground in a dry-ice pulverizer and the resulting particles are dissolved in an aqueous solution of 3 percent sodium chloride brine to form a solution concentration of about 2500 ppm in the polymacrylamide gel. This polyacrylamide polymer solution has an intrinsic viscosity of 14.6 dl/g, screen factor of 34.5, and a Brookfield LV-1 viscosity of 21.0 cp.

EXAMPLE 3

When the experiment is carried out on other polymer gels, according to the procedures of Examples 1 and 2, similar results are obtained.

EXAMPLE 4

Polyacrylamide polymer is produced by charging a 1½ gallon reactor equipped with a means for hot water heating, mixing, and purging with an inert gas, with 4750 grams of deoxygenated water substantially free from divalent ions. To this is added 250 grams of acrylamide monomer (AAM) powder to produce a concentration of 5.0 weight percent. This mixture is stirred, purged with an inert gas to insure that the mixture remains substantially oxygen-free, and heated to 40°C. for one-half hour. At this time, after the monomer has completely dissolved, 0.0075 mole of trisodium phosphate is added as a buffering compound to adjust the solution pH to 7. Free-radical initiators consisting of 400 ppm ammonium persulfate and 180 ppm sodium bisulfite based on acrylamide monomer charge are added to the reacting mixture. The reacting mixture is stirred slowly for one-half hour to insure complete mixing, and then is allowed to set in a quiescent state for 23½ hours at a temperature of 40°C.

The resulting polyacrylamide gel is then dissolved according to the process in Example 1

Modifications of the invention: It will be understood that a variety of modifications and variations of the invention will be apparent to those skilled in the art upon a reading of the present specification and that all such modifications and variations are intended to be included within the spirit of the claims appended hereto.

What is claimed is:

1. A process for the secondary-type recovery of oil comprising in combination the injection into a subterranean oil-bearing formation of an aqueous polyacrylamide solution comprising the solution prepared by:
    a. chilling a polymer gel comprised of polyacrylamide to about −30° to about −320°F.,
    b. grinding the gel while chilled to form frozen particles of the polymer having an average particle size in the range of about 250 to about 1000 microns,
    c. dissolving the ground particles of the polymer gel in water, whereby oil is displaced through said oil-bearing formation.

2. A process according to claim 1 wherein said polyacrylamide gel is prepared by:
    a. dissolving acrylamide monomer in deoxygenated water,
    b. buffering the pH from about 4.2 to about 7.0 by addition of buffer compounds,
    c. adding a polymerization catalyst to the resulting buffered acrylamide-water mixture,
    d. maintaining the resulting mixture in a substantially quiescent state for a period of time sufficient to permit the formation of said polyacrylamide gel.

3. The process of claim 1 wherein the polyacrylamide is a partially hydrolyzed polyacrylamide.

4. The process of claim 1 wherein the concentration of the polyacrylamide in the gel is about 0.001 to about 10 percent by weight.

5. The process of claim 1 wherein the molecular weight of the polyacrylamide is about 0.5 to about $40 \times 10^6$.

6. An improved process for the recovery of oil from a subterranean formation wherein an aqueous polymer solution is injected into the formation through an injection means and displaced toward a production means to recover crude oil therethrough, the steps comprising:
    a. chilling a polymer gel comprised of hydroxyethyl cellulose, vinyl acetate-crotonic acid copolymer, and polyvinyl acetate/polyvinylpyrrolidone to a temperature of about −30° to about −320°F.,
    b. grinding the gel while chilled to form frozen particles of the polymer having an average particle size in the range of about 250 to about 1000 microns, and
    c. dissolving the ground particles of the polymer gel in water and thereafter injecting the aqueous polymer solution into the reservoir.

7. The process of claim 6 wherein the molecular weight of the polymer is at least about $0.1 \times 10^6$.

* * * * *